United States Patent
Xiao et al.

(10) Patent No.: US 8,848,305 B2
(45) Date of Patent: Sep. 30, 2014

(54) SYSTEMS AND METHODS FOR HARD DECISION BASED ITI CANCELLATION

(75) Inventors: Jun Xiao, Fremont, CA (US); Erich F. Haratsch, Bethlehem, PA (US); Fan Zhang, Milipitas, CA (US)

(73) Assignee: LSI Corporation, San Jose, CA (US)

( * ) Notice: Subject to any disclaimer, the term of this patent is extended or adjusted under 35 U.S.C. 154(b) by 20 days.

(21) Appl. No.: 13/618,317

(22) Filed: Sep. 14, 2012

(65) Prior Publication Data

US 2014/0078608 A1  Mar. 20, 2014

(51) Int. Cl.
*G11B 5/09* (2006.01)

(52) U.S. Cl.
USPC .......................................... 360/45

(58) Field of Classification Search
CPC ............. G11B 20/1037; G11B 20/10509
See application file for complete search history.

(56) References Cited

U.S. PATENT DOCUMENTS

| | | | |
|---|---|---|---|
| 6,052,244 A * | 4/2000 | Haraguchi et al. | 360/46 |
| 7,729,071 B2 * | 6/2010 | Harada | 360/39 |
| 8,250,434 B2 | 8/2012 | Yang et al. | |
| 8,638,513 B1 * | 1/2014 | Burd | 360/39 |
| 2012/0063022 A1 | 3/2012 | Mathew | |
| 2012/0063023 A1 | 3/2012 | Mathew | |
| 2012/0063024 A1 | 3/2012 | Mathew | |
| 2012/0063284 A1 | 3/2012 | Mathew | |
| 2012/0105994 A1 | 5/2012 | Bellorado | |

OTHER PUBLICATIONS

Haratsch "Intertrack Interference Cancellation for Shingled Magnetic Recording" IEEE Trans. on Mag. vol. 47 No. 10 Oct. 31, 2011.
Gibson et al "Directions for Shingled-Write and Two-Dimensional Magnetic Recording System" Architectures: Synergies with Solid-State Disks Carnegie Mellon Univ. May 1, 2009.
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Daniell L Negron
(74) *Attorney, Agent, or Firm* — Hamilton DeSanctis & Cha

(57) ABSTRACT

Embodiments of the present inventions are related to systems and methods for data processing, and more particularly to systems and methods for reducing inter-track interference in relation to processing data retrieved from a storage medium.

20 Claims, 9 Drawing Sheets

SYSTEMS AND METHODS FOR HARD DECISION BASED ITI CANCELLATION

BACKGROUND

Embodiments of the present inventions are related to systems and methods for data processing, and more particularly to systems and methods for reducing inter-track interference in relation to processing data retrieved from a storage medium.

Data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges.

FIG. 1b shows an existing track to track layout 100 of data on a storage medium. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of read back data.

Hence, for at least the aforementioned reasons, there exists a need in the art for advanced systems and methods for inter-track interference compensation.

BRIEF SUMMARY

Embodiments of the present inventions are related to systems and methods for data processing, and more particularly to systems and methods for reducing inter-track interference in relation to processing data retrieved from a storage medium.

Some embodiments of the present invention provide a data processing system that includes an inter-track interference cancellation circuit. The inter-track interference cancellation circuit is operable to calculate an estimated inter-track interference between an element of a first data set from a first location on a storage medium and one or more elements of a second data set from a second location on the storage medium. The inter-track interference is calculated based at least in part on a feedback derived from a decoded data set.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION

Figure 1A:
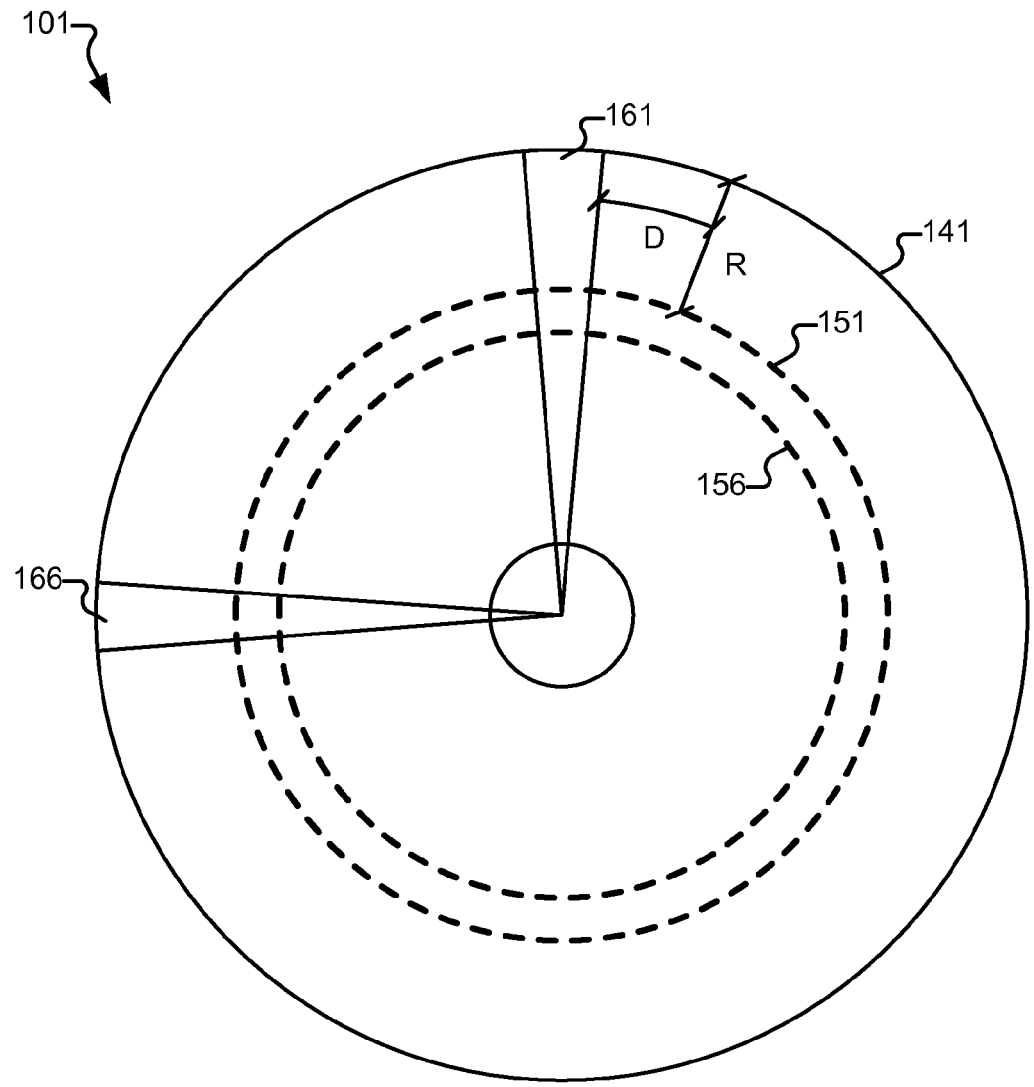
FIG. 1a depicts an existing storage medium including servo data.
Figure 1B:
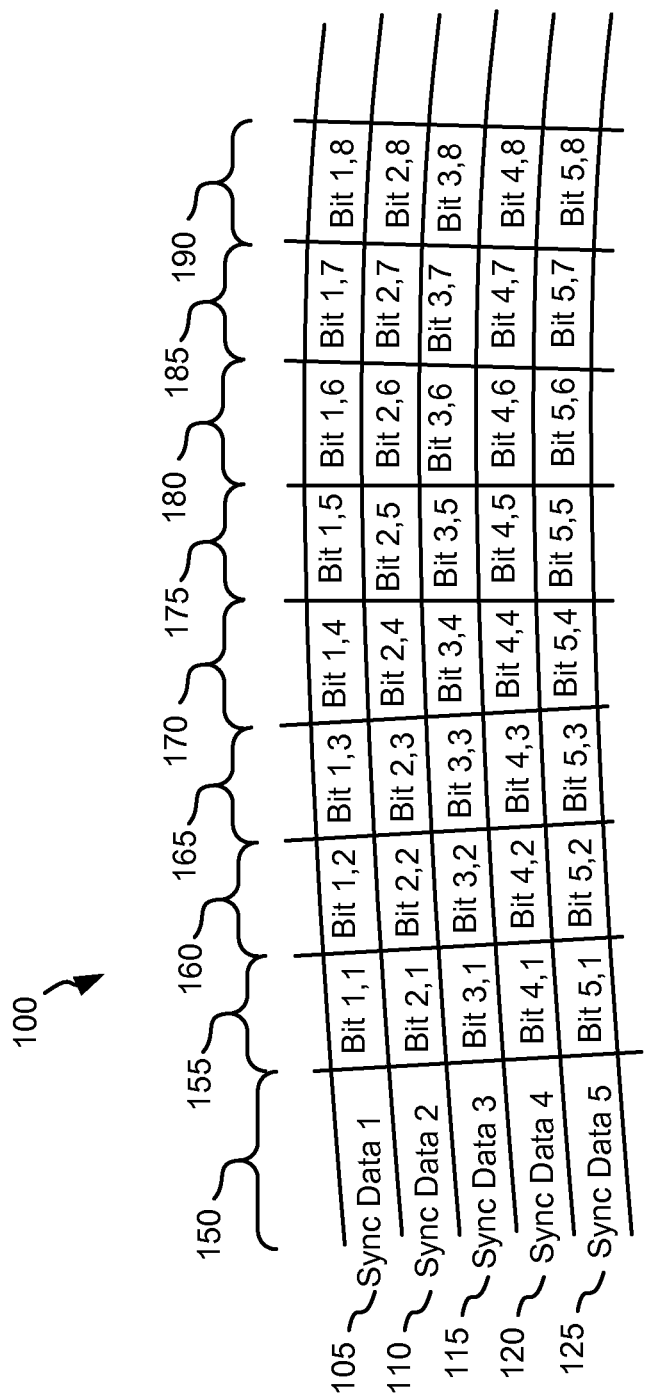
FIG. 1b depicts an existing track to track layout of data on a storage medium.

Embodiments of the present inventions are related to systems and methods for data processing, and more particularly to systems and methods for reducing inter-track interference in relation to processing data retrieved from a storage medium.

In a storage system where bit period density has increased to the point that interference from one bit period location to another bit period location occurs, inter-track interference between bit periods in surrounding tracks may be estimated by correlating a read back signal from track being processed with hard data bits (i.e., non-return to zero (NRZ) data bits) from an adjacent or side track. These bits are referred to herein as side track NRZ data.

Various embodiments of the present invention utilize a combination of a data detector circuit and a data decoder circuit to process data sets. In particular, a data set is processed through a data detector circuit to yield a detected output, and the detected output is processed through the data decoder circuit to yield a decoded output. Where the data decoder circuit converges (i.e., yields the original data set as indicated by, for example, resolution of all check equations built into the data set) or a timeout condition is met, the data is provided as a hard decision output. In some cases, the inventions include estimating inter-track interference using, where possible, data processed through the data decoder circuit. The data used may be either the hard decision data or the decoded output.

Some embodiments of the present invention provide a data processing system that includes an inter-track interference cancellation circuit. The inter-track interference cancellation circuit is operable to calculate an estimated inter-track interference between an element of a first data set from a first location on a storage medium and one or more elements of a second data set from a second location on the storage medium. The inter-track interference is calculated based at least in part on a feedback derived from a decoded data set.

In some instances of the aforementioned embodiments, the systems further include a data detector circuit and a data decoder circuit. The data detector circuit is operable to apply a data detection algorithm to a data input to yield a detected output, and the data decoder circuit is operable to apply a data decoding algorithm to the detected output to yield the decoded data set. The data detector circuit may be, but is not limited to, a maximum a posteriori data detector circuit, or a Viterbi algorithm data detector circuit. The data decoder circuit may be, but is not limited to, a low density parity check decoder circuit. In some cases, the inter-track interference is only calculated after a pass through the data detector circuit and the data decoder circuit for the data input.

In various instances of the aforementioned embodiments, the data detector circuit is a first data detector circuit, the detected output is a first detected output, the data detection algorithm is a first data detection algorithm, the estimated inter-track interference is a first estimated inter-track interference, and the systems further include a second data detector circuit operable to apply a second data detection algorithm to the data input to yield a second detected output. In such instances, the inter-track interference cancellation circuit may be further operable to calculate a second estimated inter-track interference between the element of the first data set the one or more elements of the second data set based at least in part on the second detected output. In some such instances, the second estimated inter-track interference is calculated prior to a first pass through the data detector circuit and the data decoder circuit for the data input, and the second estimated inter-track interference is calculated after the first pass through the data detector circuit and the data decoder circuit for the data input.

Other embodiments of the present invention provide methods for canceling inter-track interference. Such methods include: receiving a first data set derived from a selected track on a storage medium; receiving a second data set derived from a track adjacent to the selected track on the storage medium where the second data set has been processed through a data detector circuit and a data decoder circuit; applying a data detection algorithm to a detector input derived from the first data set by the data detector circuit to yield a detected output; applying a data decoding algorithm to the detected output by a data decoder circuit to yield a decoded output; and calculating an estimated inter-track interference based at least upon a combination of the second data set and a feedback derived from the decoded output.

Various embodiments of the present invention provide data storage devices that include: a storage medium, a read/write head assembly disposed in relation to the storage medium, an analog to digital converter circuit, and a read channel circuit. The analog to digital converter circuit is operable to convert an information set from the storage medium via the read/write head assembly into a sample set. The read channel circuit includes an equalizer circuit operable to equalize the sample set to yield a data input; a data detector circuit operable to apply a data detection algorithm to a detector input derived from the data input to yield a detected output; a data decoder circuit operable to apply a data decoding algorithm to the detected output to yield a decoded data set; and an inter-track interference cancellation circuit operable to calculate an estimated inter-track interference between an element of the data input and one or more elements of a data set from a location adjacent to the information set on the storage medium. inter-track interference is calculated based at least in part on a feedback derived from a decoded data set.

Figure 2:
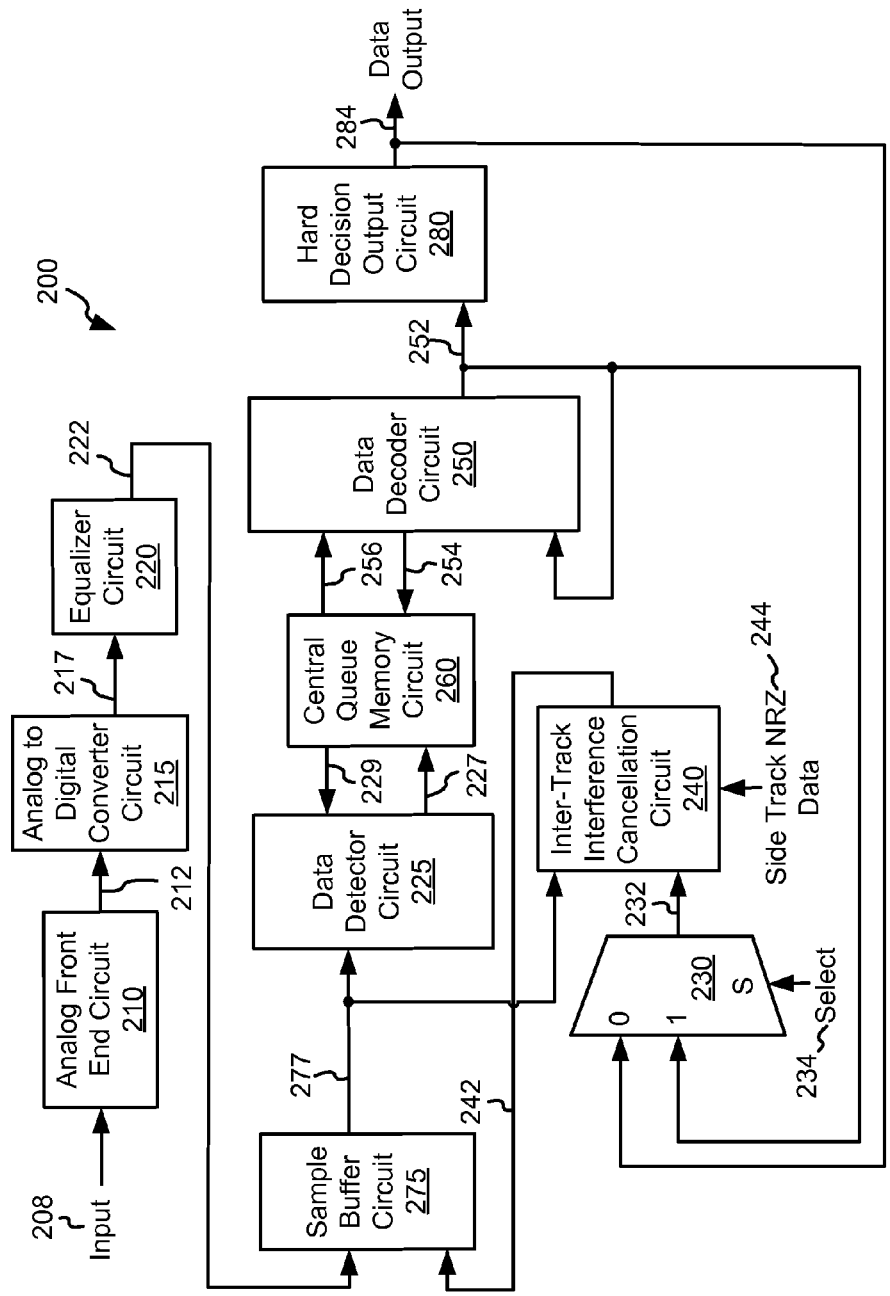
FIG. 2 shows a data processing circuit including selectable decoded output/hard decision output based ITI cancellation circuitry in accordance with some embodiments of the present invention.

Turning to FIG. 2, a data processing circuit 200 including selectable decoded output/hard decision output based ITI cancellation circuitry is shown in accordance with some embodiments of the present invention. Data processing circuit 200 includes an analog front end circuit 210 that receives an analog input 208. Analog front end circuit 210 processes analog input 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog input 208 is derived from a read/write head assembly (not shown) that is disposed in relation to a storage medium (not shown). In other cases, analog input 208 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 208 may be derived.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 217 are provided to an equalizer circuit 220. Equalizer circuit 220 applies an equalization algorithm to digital samples 217 to yield an equalized output 222. In some embodiments of the present invention, equalizer circuit 220 is a digital finite impulse response filter circuit as are known in the art.

Equalized output 222 is provided to a sample buffer circuit 275 where it is initially provided as buffered data 277. Buffered data 277 from sample buffer circuit 275 is provided to a data detector circuit 225. In some cases data detector circuit 225 includes a primary data detector circuit and a secondary data detector circuit. In such a case, equalized output 222 may be provided directly to the secondary data detector circuit skipping sample buffer circuit 275. Sample buffer circuit 275 stores equalized output 222 as buffered data 277 for use in subsequent iterations through data detector circuit 225. Data detector circuit 225 may be any data detector circuit known in the art that is capable of producing a detected output 227. As some examples, data detector circuit 225 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 227 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 227 is provided to a central queue memory circuit 260 that operates to buffer data passed between data detector circuit 225 and data decoder circuit 250. In some cases, central queue memory circuit 260 includes interleaving (i.e., data shuffling) and de-interleaving (i.e., data un-shuffling) circuitry known in the art. When data decoder circuit 250 is available, data decoder circuit 250 accesses detected output 227 from central queue memory circuit 260 as a decoder input 256. Data decoder circuit 250 applies a data decoding algorithm to decoder input 156 in an attempt to recover originally written data. The result of the data decoding algorithm is provided as a decoded output 252. Similar to detected output 227, decoded output 252 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 275 is close to getting filled up), decoded output 252 is stored to a memory included in a hard decision output circuit 280. In turn, hard decision output circuit 280 provides the converged decoded output 252 as a data output 284 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 252 indicates that the data is unusable as is more specifically discussed below, and data output 284 is similarly identified as unusable.

One or more iterations through the combination of data detector circuit 225 and data decoder circuit 250 may be made in an effort to converge on the originally written data set. As mentioned above, processing through both the data detector circuit and the data decoder circuit is referred to as a "global iteration". For the first global iteration, data detector circuit 225 applies the data detection algorithm to equalized output 222 received as buffered data 277 without guidance from a decoded output. For subsequent global iterations, data detector circuit 225 applies the data detection algorithm to buffered data 277 as guided by decoded output 252. For the second and later global iterations, buffered data 277 may be overwritten by corrected data 242 or may remain equalized data 222 depending upon whether inter-track interference cancellation is performed during both standard processing (i.e., online processing) and retry processing (i.e., offline processing) as more fully described below. To facilitate this guidance, decoded output 252 is stored to central queue memory circuit 260 as a decoder output 254, and is provided from central queue memory circuit 260 as a detector input 229 when buffered data 277 is being re-processed through data detector circuit 225.

During each global iteration it is possible for data decoder circuit 250 to make one or more local iterations including application of the data decoding algorithm to decoder input 256. For the first local iteration, data decoder circuit 250 applies the data decoder algorithm without guidance from decoded output 252. For subsequent local iterations, data decoder circuit 250 applies the data decoding algorithm to decoder input 256 as guided by a previous decoded output 252. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 250 exceeds that allowed, but it is determined that at least one additional global iteration during standard processing of the data set is allowed, decoded output 252 is provided back to central queue memory circuit 260 as decoded output 254. Decoded output 254 is maintained in central queue memory circuit 260 until data detector circuit 225 becomes available to perform additional processing.

In contrast, where the number of local iterations through data decoder circuit 250 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Buffered data 277 is initially equalized output 222, but is replaced by corrected data 242 to accommodate one or both of the second or later global iterations of standard processing or iterations of retry processing. As used herein, retry processing is any enhanced processing performed on data maintained in sample buffer circuit 275 where standard processing fails to converge. To perform inter-track interference cancellation, buffered data 277 is provided to an inter-track interference cancellation circuit 240 that calculates inter-track interference and subtracts the calculated inter-track interference from the received buffered data 277 to yield corrected data 242. The inter-track interference may be calculated consistent with that discussed in US Pat. Publication No. US2012/0063023A1 entitled "Systems and Methods for Block-wise Inter-track Interference Compensation", and filed by Mathew et al. on Jul. 19, 2011. The entirety of the aforementioned reference is incorporated herein by reference for all purposes. In particular, the approach for inter-track interference calculation may be done in accordance with the equations presented in the aforementioned reference except that the α input corresponding to a feedback input 232.

Alternatively, the inter-track interference may be calculated in accordance with the following equation:

Interference=$g^-[k]*a^-[n-k]$, where $g^-[k]$=Average over n samples of $\{e[n]·a^-[n-k]\}$, and $e[n]$=Buffered Data$[n]$277−$\Sigma g[k]·â[n-k]\}$.

In the aforementioned equations, â[n−k] is feedback input 232, g[k] is an ITI response coefficient that may be pre-calculated, $a^-$[n−k] is side track NRZ data 244 (i.e., hard decision data from a track adjacent to the track currently being processed. In some cases, n is five thousand (5000) samples, however, one of ordinary skill in the art will recognize other numbers of samples that may be used in relation to different embodiments of the present invention. Feedback input 232 is selected as one of decoded output 252 or data output 284 by a selector circuit 230 depending upon a selection input 234. Alternatively one or the other of decoded output 252 or data output 284 may be hardwired as feedback input 232 in which case selector circuit 230 is eliminated.

The calculated interference is then subtracted from buffered data 277 by inter-track interference cancellation circuit 240 to yield corrected output 242 in accordance with the following equation:

CorrectedOutput242$[n]$=Buffered Data$[n]$277−Interference$[n]$, where n indicates the particular bit or symbol. Corrected data 242 is then written to sample buffer circuit 275 where it can then be provided as buffered data 277 for subsequent iterations through data detector circuit 225 and data decoder circuit 250.

Where inter-track interference cancellation is done during standard processing, decoded output 252 available after the first global interference is provided to inter-track interference cancellation circuit 240 where it is used to calculate corrected output 242 that is used in place of equalized output 222 for all subsequent global iterations. Alternatively, where inter-track interference cancellation is done only for retry processing, data output 284 available after failure of data decoder circuit 250 to converge during standard processing is provided to inter-track interference cancellation circuit 240 where it is used to calculate corrected output 242 that is used in place of equalized output 222 for all subsequent global iterations during the retry processing.

Figure 3A:
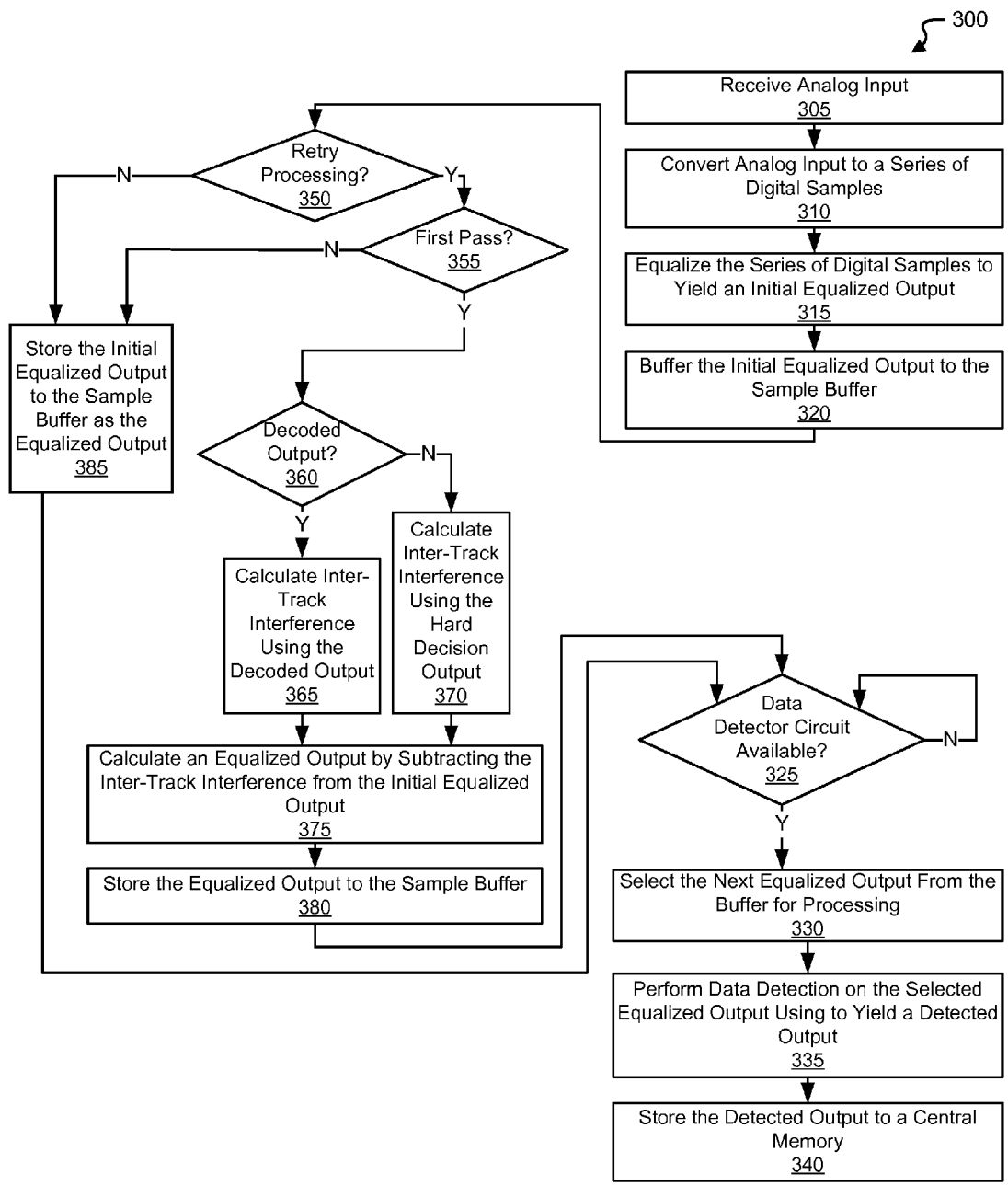
FIGS. 3a-3b are flow diagrams showing a method in accordance with various embodiments of the present invention for processing data using decoded output or hard decision output based ITI cancellation.
Figure 3B:
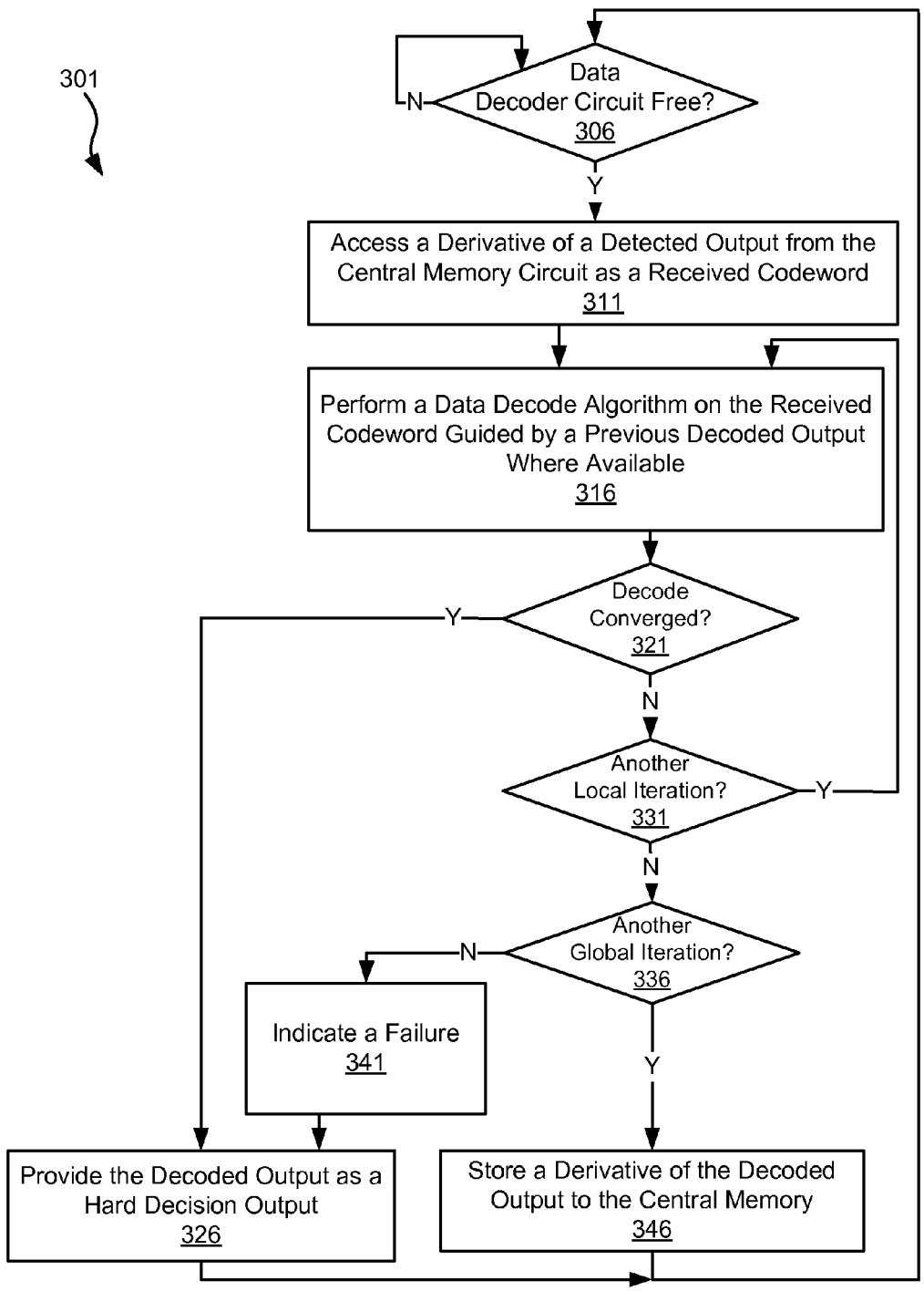

Turning to FIGS. 3a-3b, flow diagrams 300, 301 show a method in accordance with various embodiments of the present invention for processing data using decoded output or hard decision output based ITI cancellation. Following flow diagram 300 of FIG. 3a, an analog input is received (block 305). The analog input may be derived from, for example, a storage medium or a data transmission channel. Based upon the disclosure provided herein, one of ordinary skill in the art will recognize a variety of sources of the analog input. The analog input is converted to a series of digital samples (block 310). This conversion may be done using an analog to digital converter circuit or system as are known in the art. Of note, any circuit known in the art that is capable of converting an analog signal into a series of digital values representing the received analog signal may be used. The resulting digital samples are equalized to yield an initial equalized output (block 315). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The initial equalized output is stored to a buffer (block 320).

It is determined whether retry processing is underway (block 350). Retry processing occurs when standard processing (i.e., an initial number of global iterations applied to a data set) fails to converge, and relies on equalized data previously stored in the sample buffer during standard processing. Where retry processing is underway (block 350), it is determined whether it is the first global iteration being applied subsequent to the standard processing (i.e., the first pass) (block 355). Where it is the first pass (block 355), it is determined whether the decoded output available at the end of standard processing is to be used to calculate inter-track interference (block 360). Where the decoded output is to be used (block 360), an estimate of inter-track interference is calculated using the decoded output (i.e., produced by block 346 of FIG. 3b) as the â[n−k] input to the equations discussed above in relation to FIG. 2 (block 365). Alternatively, where the decoded output is not to be used (block 360), an estimate of inter-track interference is calculated using the hard decision output (i.e., produced by block 326 of FIG. 3b) as the â[n−k] input to the equations discussed above in relation to FIG. 2 (block 370).

In turn, the calculated inter-track interference is used to calculate an equalized output as by subtracting the inter-track interference from the initial equalized output (block 375). The equalized output is then stored to the sample buffer in place of the initial equalized output (block 380). In contrast, where either retry processing is not underway (i.e., standard processing is still ongoing) (block 350) or it is not the first pass of the retry processing (block 355), no inter-track interference cancellation is performed and the initial equalized output is maintained in the buffer as the equalized output (block 385).

It is then determined whether a data detector circuit is available (block 325). Where the data detector circuit is available (block 325), the next equalized output from the sample buffer is selected for processing (block 330), and a data detection is performed on the selected equalized output to yield a detected output (block 335). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 340).

Following flow diagram 301 of FIG. 3b, in parallel to the previously described data detection process, it is determined whether a data decoder circuit is available (block 306). The data decoder circuit may be, for example, a low density data decoder circuit as are known in the art. Where the data decoder circuit is available (block 306), a previously stored derivative of a detected output is accessed from the central memory and used as a received codeword (block 311). A data decode algorithm is applied to the received codeword to yield a decoded output (block 316). It is then determined whether the decoded output converged (e.g., resulted in the originally written data as indicated by the lack of remaining unsatisfied checks) (block 321). Where the decoded output converged (block 321), the converged codeword is provided as a decoded output (block 326).

Alternatively, where the decoded output failed to converge (e.g., errors remain) (block 321), it is determined whether another local iteration is desired (block 331). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 331), the data decode algorithm is re-applied using the current decoded output as a guide (block 316).

Alternatively, where another local iteration is not desired (block 331), it is determined whether another global iteration is allowed (block 336). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 336), a derivative of the decoded output is stored to the central memory (block 346). The derivative of the decoded output being stored to the central memory triggers the data set ready query of block 305 to begin the data detection process. Alternatively, where another global iteration is not allowed (block 336), a failure to converge is indicated (block 341), and the current decoded output is provided (block 326).

Figure 4:
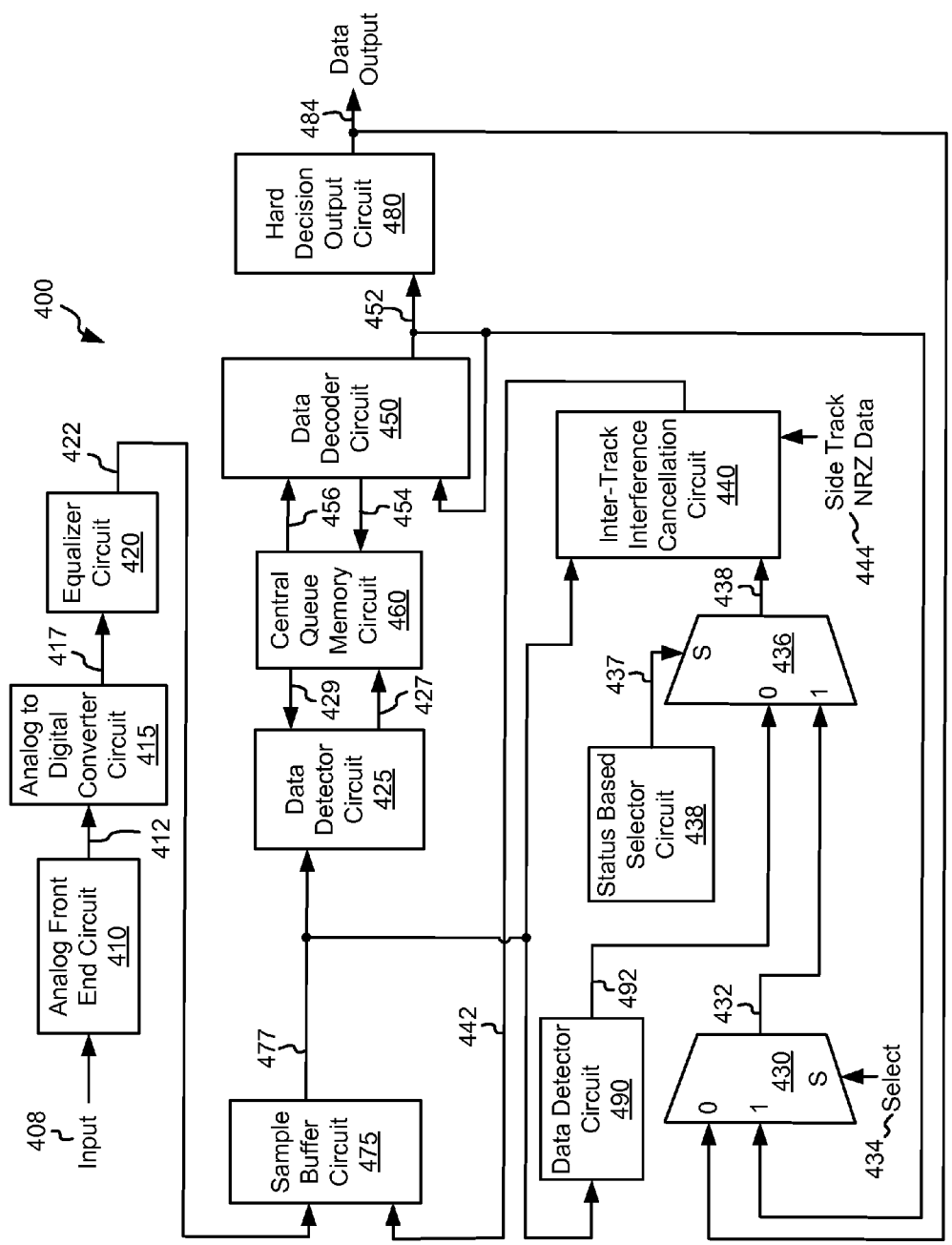
FIG. 4 shows a data processing circuit including selectable decoded or hard decision output/detected output based ITI cancellation circuitry.

Turning to FIG. 4, a data processing circuit 400 including selectable decoded or hard decision output/detected output based ITI cancellation circuitry is shown in accordance with various embodiments of the present invention. Data processing circuit 400 includes an analog front end circuit 410 that receives an analog input 408. Analog front end circuit 410 processes analog input 408 and provides a processed analog signal 412 to an analog to digital converter circuit 415. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog input 408 is derived from a read/write head assembly (not shown) that is disposed in relation to a storage medium (not shown). In other cases, analog input 408 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 408 may be derived.

Analog to digital converter circuit 415 converts processed analog signal 412 into a corresponding series of digital samples 417. Analog to digital converter circuit 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 417 are provided to an equalizer circuit 420. Equalizer circuit 420 applies an equalization algorithm to digital samples 417 to yield an equalized output 422. In some embodiments of the present invention, equalizer circuit 420 is a digital finite impulse response filter circuit as are known in the art.

Equalized output 422 is provided to a sample buffer circuit 475 where it is initially provided as buffered data 477 to an inter-track interference cancellation circuit 440 that calculates inter-track interference and subtracts the calculated interference from buffered data 477 to yield a corrected output 442. Corrected output 442 is used to overwrite equalized data 422, and is then provided as buffered data 477 to a data detector circuit 425. The process of yielding corrected data 442 is more fully discussed below.

In some cases data detector circuit 425 includes a primary data detector circuit and a secondary data detector circuit. In such a case, equalized output 422 may be provided directly to the secondary data detector circuit skipping sample buffer circuit 475. Sample buffer circuit 475 stores equalized output 422 as buffered data 477 for use in subsequent iterations through data detector circuit 425. Data detector circuit 425 may be any data detector circuit known in the art that is capable of producing a detected output 427. As some examples, data detector circuit 425 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 427 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a central queue memory circuit 460 that operates to buffer data passed between data detector circuit 425 and data decoder circuit 450. In some cases, central queue memory circuit 460 includes interleaving (i.e., data shuffling) and de-interleaving (i.e., data un-shuffling) circuitry known in the art. When data decoder circuit 450 is available, data decoder circuit 450 accesses detected output 427 from central queue memory circuit 460 as a decoder input 456. Data decoder circuit 450 applies a data decoding algorithm to decoder input 156 in an attempt to recover originally written data. The result of the data decoding algorithm is provided as a decoded output 452. Similar to detected output 427, decoded output 452 may include both hard decisions and soft decisions. For example, data decoder circuit 450 may be any data decoder circuit known in the art that is capable of applying a decoding algorithm to a received input. Data decoder circuit 450 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs (e.g., if sample buffer circuit 475 is close to getting filled up), decoded output 452 is stored to a memory included in a hard decision output circuit 480. In turn, hard decision output circuit 480 provides the converged decoded output 452 as a data output 484 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 452 indicates that the data is unusable as is more specifically discussed below, and data output 484 is similarly identified as unusable.

One or more iterations through the combination of data detector circuit 425 and data decoder circuit 450 may be made in an effort to converge on the originally written data set. As mentioned above, processing through both the data detector circuit and the data decoder circuit is referred to as a "global iteration". For the first global iteration, data detector circuit 425 applies the data detection algorithm to equalized output 422 received as buffered data 477 without guidance from a decoded output. For subsequent global iterations, data detector circuit 425 applies the data detection algorithm to buffered data 477 as guided by decoded output 452. For the second and later global iterations, buffered data 477 may be overwritten by corrected data 442 or may remain equalized data 422 depending upon whether inter-track interference cancellation is performed during both standard processing (i.e., online processing) and retry processing (i.e., offline processing) as more fully described below. To facilitate this guidance, decoded output 452 is stored to central queue memory circuit 460 as a decoder output 454, and is provided from central queue memory circuit 460 as a detector input 429 when buffered data 477 is being re-processed through data detector circuit 425.

During each global iteration it is possible for data decoder circuit 450 to make one or more local iterations including application of the data decoding algorithm to decoder input 456. For the first local iteration, data decoder circuit 450 applies the data decoder algorithm without guidance from decoded output 452. For subsequent local iterations, data decoder circuit 450 applies the data decoding algorithm to decoder input 456 as guided by a previous decoded output 452. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 450 exceeds that allowed, but it is determined that at least one additional global iteration during standard processing of the data set is allowed, decoded output 452 is provided back to central queue memory circuit 460 as decoded output 454. Decoded output 454 is maintained in central queue memory circuit 460 until data detector circuit 425 becomes available to perform additional processing.

In contrast, where the number of local iterations through data decoder circuit 450 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

As mentioned above, buffered data 477 is initially equalized output 422, but is replaced by corrected data 442 to accommodate processing through data detector circuit 425 and data decoder circuit 450 for the first and later global iterations, or for retry processing. To perform inter-track interference cancellation, buffered data 477 is provided to an inter-track interference cancellation circuit 440 that calculates inter-track interference and subtracts the calculated inter-track interference from the received buffered data 477 to yield corrected data 442. The inter-track interference may be calculated consistent with that discussed in US Pat. Publication No. US2012/0063023A1 entitled "Systems and Methods for Block-wise Inter-track Interference Compensation", and filed by Mathew et al. on Jul. 19, 4011. The aforementioned reference was previously incorporated herein by reference for all purposes. In particular, the approach for inter-track interference calculation may be done in accordance with the equations presented in the aforementioned reference except that the a input corresponding to a feedback input 438.

Alternatively, the inter-track interference may be calculated in accordance with the following equation:

Interference=$g^-[k]a^-[n-k]$, where $g^-[k]$=Average over $n$ samples of $\{e[n] \cdot a^-[n-k]\}$, and $e[n]$=Buffered Data$[n]$477$-\Sigma g[k] \cdot \hat{a}[n-k]\}$.

In the aforementioned equations, â[n−k] is feedback input 438, g[k] is an ITI response coefficient that may be pre-calculated, a⁻[n−k] is side track NRZ data 444 (i.e., hard decision data from a track adjacent to the track currently being processed. In some cases, n is five thousand (5000) samples, however, one of ordinary skill in the art will recognize other numbers of samples that may be used in relation to different embodiments of the present invention. Feedback input 438 is selected as one of a detected output 492 or a feedback input 432 by a selector circuit 436 depending upon a selection input 437. Selection input 437 is provided from a status based selector circuit 438. In one embodiment of the present invention, status based selector circuit 438 causes detected output 492 to be selected before a first global iteration, and feedback input 432 to be selected during a second global iteration. Feedback input 432 is selected as one of decoded output 452 or data output 484 by a selector circuit 430 depending upon a selection input 434. Alternatively one or the other of decoded output 452 or data output 484 may be hardwired as feedback input 432 in which case selector circuit 430 is eliminated.

The calculated interference is then subtracted from buffered data 477 by inter-track interference cancellation circuit 440 to yield corrected output 442 in accordance with the following equation:

Corrected Output442[n]=Buffered Data[n]477−Interference[n], where n indicates the particular bit or symbol. Corrected data 442 is then written to sample buffer circuit 475 where it can then be provided as buffered data 477 for subsequent iterations through data detector circuit 425 and data decoder circuit 450.

Feedback input 432 may be selected as a detected output 492, data output 484, or decoded output 452 by a selector circuit 430 and a selector circuit 436. Where inter-track interference cancellation is done during standard processing, the process of calculating inter-track interference is done twice. The first time it is done before a data set is processed through data detector circuit 425 and data decoder circuit 450 using a detected output 492 as feedback input 438. The second time it is done using decoded output 452 resulting from a preceding global iteration as feedback input 438. Detected output 492 is provided by a data detector circuit 490 that provides an approximation of the output from data detector circuit 425. This approximation is less accurate than decoded output 452 that is available later. As such, corrected data 442 calculated prior to the first global iteration is less accurate than that calculated after the first global iteration. As the more correct data is available, sample buffer 475 is overwritten to reflect the more accurate data. Alternatively, where inter-track interference cancellation is done only for retry processing, data output 484 available after failure of data decoder circuit 450 to converge during standard processing is provided to inter-track interference cancellation circuit 440 where it is used to calculate corrected output 442 that is used in place of equalized output 422 for all subsequent global iterations during the retry processing.

Figure 5A:
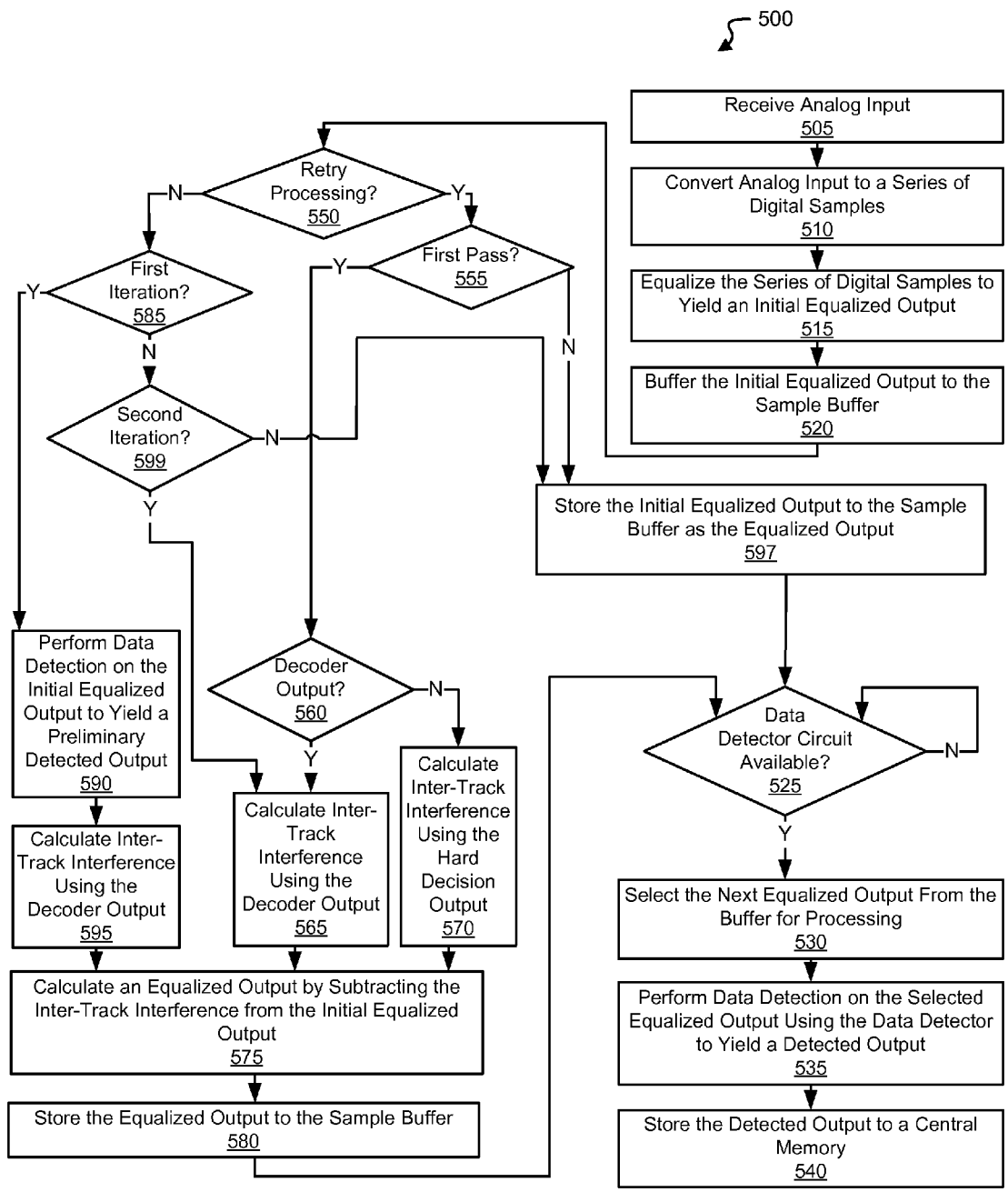
FIGS. 5a-5b are flow diagrams showing a method in accordance with one or more embodiments of the present invention for processing data using selectable decoded output or hard decision output/detected output based ITI cancellation.
Figure 5B:
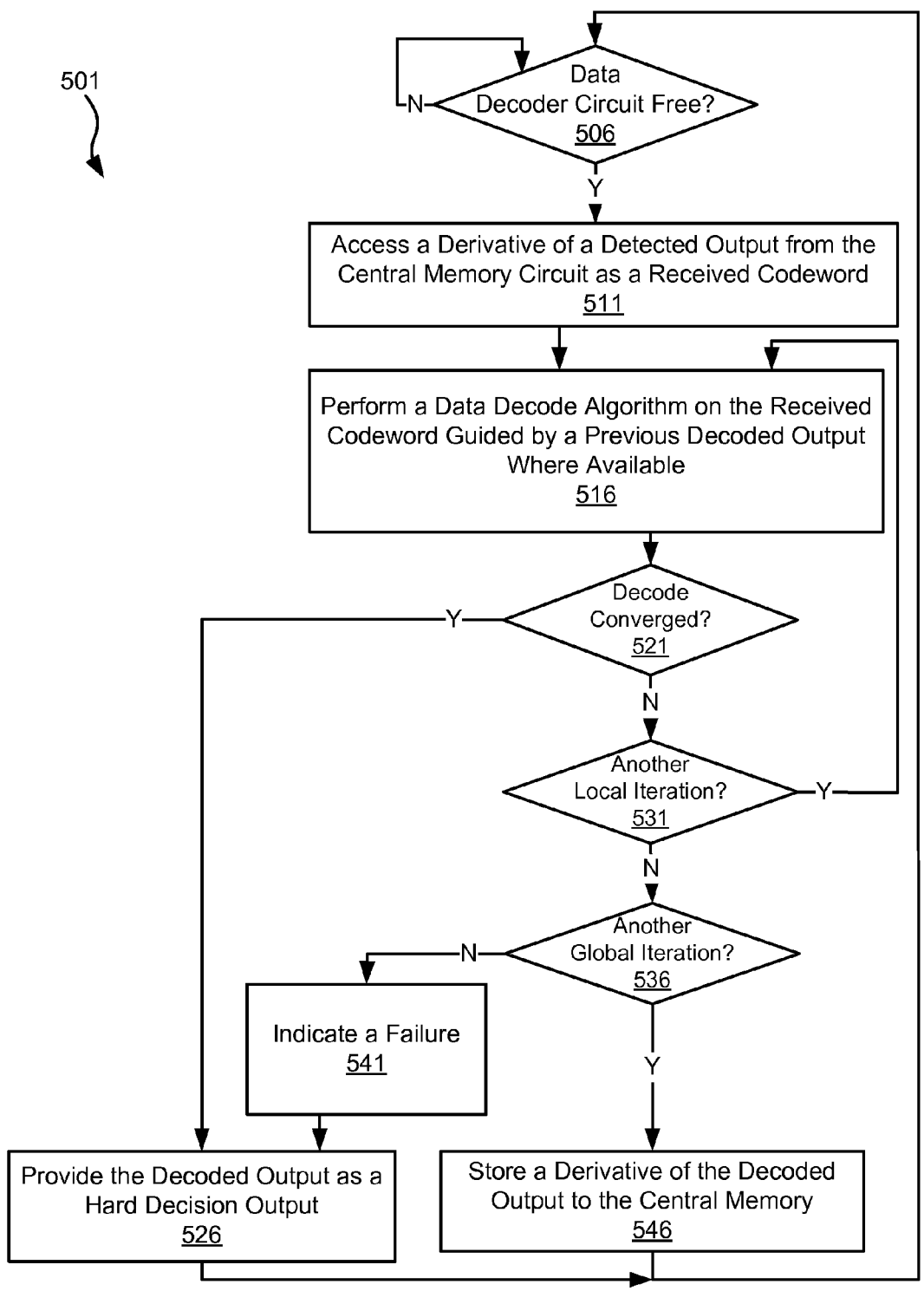

Turning to FIGS. 5a-5b, flow diagrams 500, 501 show a method in accordance with various embodiments of the present invention for processing data using selectable decoded output or hard decision output/detected output based ITI cancellation. Following flow diagram 500 of FIG. 5a, an analog input is received (block 505). The analog input may be derived from, for example, a storage medium or a data transmission channel. Based upon the disclosure provided herein, one of ordinary skill in the art will recognize a variety of sources of the analog input. The analog input is converted to a series of digital samples (block 510). This conversion may be done using an analog to digital converter circuit or system as are known in the art. Of note, any circuit known in the art that is capable of converting an analog signal into a series of digital values representing the received analog signal may be used. The resulting digital samples are equalized to yield an initial equalized output (block 515). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The initial equalized output is stored to a buffer (block 520).

It is determined whether retry processing is underway (block 550). Retry processing occurs when standard processing (i.e., an initial number of global iterations applied to a data set) fails to converge, and relies on equalized data previously stored in the sample buffer during standard processing. Where retry processing is underway (block 550), it is determined whether it is the first global iteration being applied subsequent to the standard processing (i.e., the first pass) (block 555). Where it is the first pass (block 555), it is determined whether the decoded output available at the end of standard processing is to be used to calculate inter-track interference (block 560). Where the decoded output is to be used (block 560), an estimate of inter-track interference is calculated using the decoded output (i.e., produced by block 546 of FIG. 5b) as the â[n−k] input to the equations discussed above in relation to FIG. 4 (block 565). Alternatively, where the decoded output is not to be used (block 560), an estimate of inter-track interference is calculated using the hard decision output (i.e., produced by block 526 of FIG. 5b) as the â[n−k] input to the equations discussed above in relation to FIG. 4 (block 570).

Where retry processing is not underway (i.e., standard processing is still ongoing) (block 550), it is determined whether it is the first iteration (first global iteration applied to the data set) (block 585). Where it is the first iteration (block 585), a data detection is applied to the initial equalized output to yield a preliminary detected output (block 590). The data detection may be a limited data detection process as are known in the art. An estimate of inter-track interference is calculated using the preliminary detected output as the â[n−k] input to the equations discussed above in relation to FIG. 4 (block 595). Alternatively, where it is not the first iteration (block 585), it is determined whether the second iteration is next (block 599). Where the second iteration is next (block 599), an estimate of inter-track interference is calculated using the decoded output from the preceding iteration (i.e., produced by block 546 of FIG. 5b) as the â[n−k] input to the equations discussed above in relation to FIG. 4 (block 565).

In turn, the calculated inter-track interference is used to calculate an equalized output as by subtracting the inter-track interference from the initial equalized output (block 575). The equalized output is then stored to the sample buffer in place of the initial equalized output (block 580). In contrast, where either retry processing is not underway and it is not either the first or second global iteration for the data set (i.e., standard processing is still ongoing) (block 550, 585, 599) it is not the first pass of the retry processing (block 555), no inter-track interference cancellation is performed and the initial equalized output is maintained in the buffer as the equalized output (block 597).

It is then determined whether a data detector circuit is available (block 525). Where the data detector circuit is available (block 525), the next equalized output from the sample buffer is selected for processing (block 530), and a data detection is performed on the selected equalized output to yield a detected output (block 535). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 540).

Following flow diagram 501 of FIG. 5b, in parallel to the previously described data detection process, it is determined whether a data decoder circuit is available (block 506). The data decoder circuit may be, for example, a low density data decoder circuit as are known in the art. Where the data decoder circuit is available (block 506), a previously stored derivative of a detected output is accessed from the central memory and used as a received codeword (block 511). A data decode algorithm is applied to the received codeword to yield a decoded output (block 516). It is then determined whether the decoded output converged (e.g., resulted in the originally written data as indicated by the lack of remaining unsatisfied checks) (block 521). Where the decoded output converged (block 521), the converged codeword is provided as a decoded output (block 526).

Alternatively, where the decoded output failed to converge (e.g., errors remain) (block 521), it is determined whether another local iteration is desired (block 531). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 531), the data decode algorithm is re-applied using the current decoded output as a guide (block 516).

Alternatively, where another local iteration is not desired (block 531), it is determined whether another global iteration is allowed (block 536). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 536), a derivative of the decoded output is stored to the central memory (block 546). The derivative of the decoded output being stored to the central memory triggers the data set ready query of block 505 to begin the data detection process. Alternatively, where another global iteration is not allowed (block 536), a failure to converge is indicated (block 541), and the current decoded output is provided (block 526).

Figure 6:
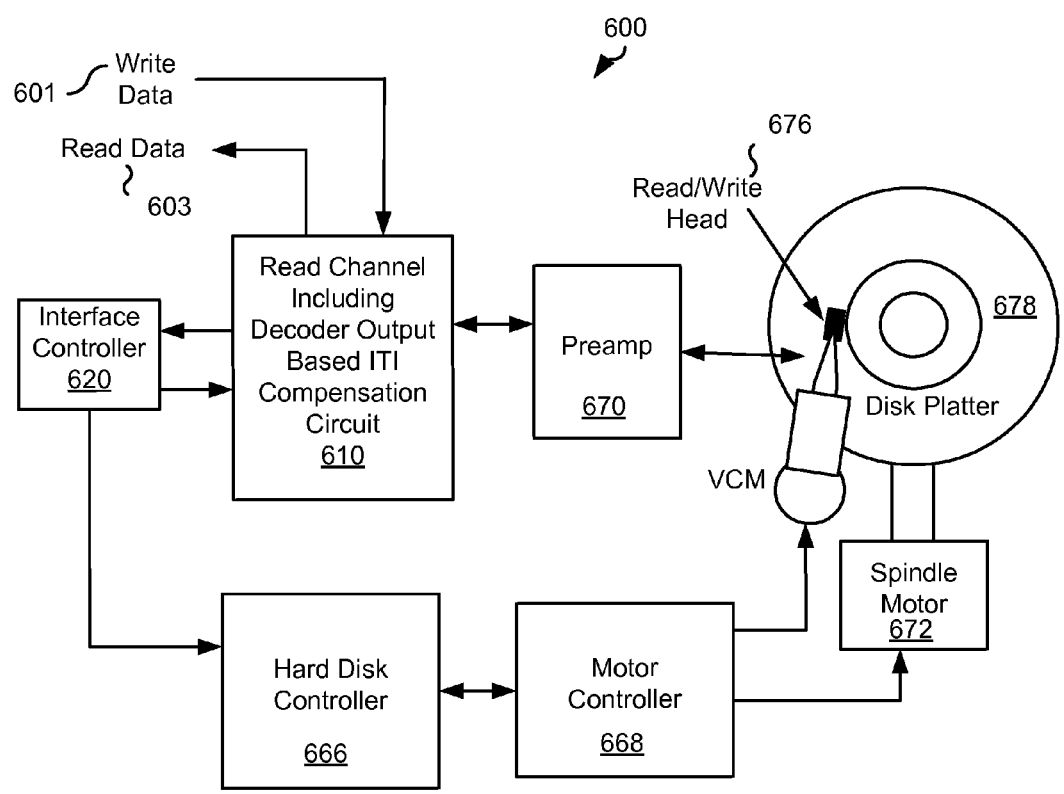
FIG. 6 shows a storage system with a decoded output based inter-track interference compensation circuit in accordance with various embodiments of the present invention.

Turning to FIG. 6, a storage system 600 including a read channel circuit 610 with a decoded output based inter-track interference compensation circuit is shown in accordance with various embodiments of the present invention. Storage system 600 may be, for example, a hard disk drive. Storage system 600 also includes a preamplifier 670, an interface controller 620, a hard disk controller 666, a motor controller 668, a spindle motor 672, a disk platter 678, and a read/write head assembly 676. Interface controller 620 controls addressing and timing of data to/from disk platter 678. The data on disk platter 678 consists of groups of magnetic signals that may be detected by read/write head assembly 676 when the assembly is properly positioned over disk platter 678. In one embodiment, disk platter 678 includes magnetic signals recorded in accordance with either a longitudinal or a perpendicular recording scheme.

In a typical read operation, read/write head assembly 676 is accurately positioned by motor controller 668 over a desired data track on disk platter 678. Motor controller 668 both positions read/write head assembly 676 in relation to disk platter 678 and drives spindle motor 672 by moving read/write head assembly to the proper data track on disk platter 678 under the direction of hard disk controller 666. Spindle motor 672 spins disk platter 678 at a determined spin rate (RPMs). Once read/write head assembly 678 is positioned adjacent the proper data track, magnetic signals representing data on disk platter 678 are sensed by read/write head assembly 676 as disk platter 678 is rotated by spindle motor 672. The sensed magnetic signals are provided as a continuous, minute analog signal representative of the magnetic data on disk platter 678. This minute analog signal is transferred from read/write head assembly 676 to read channel circuit 610 via preamplifier 670. Preamplifier 670 is operable to amplify the minute analog signals accessed from disk platter 678. In turn, read channel circuit 610 decodes and digitizes the received analog signal to recreate the information originally written to disk platter 678. This data is provided as read data 603 to a receiving circuit. A write operation is substantially the opposite of the preceding read operation with write data 601 being provided to read channel circuit 610. This data is then encoded and written to disk platter 678.

During a read operation, data is sensed from disk platter 678 and processed through a data processing circuit including a data detector circuit and a data decoder circuit. This data processing includes cancellation of inter-track interference. The inter-track interference cancellation may be done using circuitry similar to that discussed above in relation to FIG. 2 or FIG. 4, and/or may use methods discussed above in relation to FIGS. 3a-3b or FIGS. 4a-4b.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 600, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 610 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 600 may be modified to include solid state memory that is used to store data in addition to the storage offered by disk platter 678. This solid state memory may be used in parallel to disk platter 678 to provide additional storage. In such a case, the solid state memory receives and provides information directly to read channel circuit 610. Alternatively, the solid state memory may be used as a cache where it offers faster access time than that offered by disk platted 678. In such a case, the solid state memory may be disposed between interface controller 620 and read channel circuit 610 where it operates as a pass through to disk platter 678 when requested data is not available in the solid state memory or when the solid state memory does not have sufficient storage to hold a newly written data set. Based upon the disclosure provided herein, one of ordinary skill in the art will recognize a variety of storage systems including both disk platter 678 and a solid state memory.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing system, the system comprising:
   an inter-track interference cancellation circuit operable to calculate an estimated inter-track interference between an element of a first data set from a first location on a storage medium and one or more elements of a second data set from a second location on the storage medium, wherein the estimated inter-track interference is calculated based at least in part on a feedback derived from a decoded data set corresponding to the first data set and hard decision data corresponding to the second data set.

2. The system of claim 1, wherein the system further comprises:
   a data detector circuit operable to apply a data detection algorithm to a data input to yield a detected output; and
   a data decoder circuit operable to apply a data decoding algorithm to the detected output to yield the decoded data set.

3. The system of claim 2, wherein the data detector circuit is selected from a group consisting of: a maximum a posteriori data detector circuit, and a Viterbi algorithm data detector circuit.

4. The system of claim 2, wherein the data decoder circuit is a low density parity check decoder circuit.

5. The system of claim 2, wherein the estimated inter-track interference is only calculated after a pass through the data detector circuit and the data decoder circuit for the data input.

6. The system of claim 2, wherein the data input is a first data input, and wherein the inter-track interference cancellation circuit is further operable to subtract the inter-track interference from a second data input to yield the first data input.

7. The system of claim 6, wherein the system further comprises an as equalizer circuit operable to equalize a sample set to yield the second data input.

8. The system of claim 1, wherein the feedback is selected from a group consisting of: a hard decision output, and a de-interleaved version of a decoded output from a data decoder circuit.

9. The system of claim 1, wherein the system is implemented as part of an integrated circuit.

10. The system of claim 1, wherein the system is incorporated in a hard disk drive including the storage medium.

11. The system of claim 1, wherein the estimated inter-track interference is a first estimated inter-track interference, wherein the decoded data set is a first decoded data set, and wherein the system further comprises:
    a data detector circuit operable to:
       apply a data detection algorithm to a data input to yield a first detected output, and
       apply the data detection algorithm to the data input to yield a second detected output;
    a data decoder circuit operable to:
       apply a data decoding algorithm to the first detected output to yield the first decoded data set, and
       apply the data decoding algorithm to the second detected output to yield the second decoded data set;
    wherein the inter-track interference cancellation circuit is further operable to calculate a second estimated inter-track interference between the element of the first data set and the one or more elements of the second data set based at least in part on the second decoded output and hard decision data derived from the second decoded output.

12. The system of claim 1, wherein the system further comprises:
    a selector circuit operable to select one of a hard decision output derived from the decoded data set or the decoded data set as the feedback.

13. A method for canceling inter-track interference, the method comprising:
    receiving a first data set derived from a selected track on a storage medium;
    receiving a second data set derived from a track adjacent to the selected track on the storage medium, wherein the second data set has been processed through a data detector circuit and a data decoder circuit;
    applying a data detection algorithm to a detector input derived from the first data set by the data detector circuit to yield a detected output;
    applying a data decoding algorithm to the detected output by a data decoder circuit to yield a decoded output; and
    calculating an estimated inter-track interference based at least upon a combination of the second data set and a feedback derived from the decoded output.

14. The method of claim 13, wherein the feedback is selected from a group consisting of: a hard decision output, and a de-interleaved version of the decoded output.

15. The method of claim 13, wherein the inter-track interference is only calculated after a pass through the data detector circuit and the data decoder circuit for the detector input.

16. The method of claim 13, wherein the method further comprises:
subtracting the estimated inter-track interference from the first data set to yield the detector input.

17. The method of claim 13, wherein the data detector circuit is a first data detector circuit, wherein the detected output is a first detected output, wherein the data detection algorithm is a first data detection algorithm, wherein the estimated inter-track interference is a first estimated inter-track interference, and wherein the method further comprises:
applying a second data detection algorithm by the second data detector circuit to the detector input to yield second detected output; and
calculating a second estimated inter-track interference based at least upon a combination of the second detected output and the second data set.

18. The method of claim 17, wherein the second estimated inter-track interference is calculated prior to a first pass through the data detector circuit and the data decoder circuit for the data input, and wherein the second estimated inter-track interference is calculated after the first pass through the data detector circuit and the data decoder circuit for the data input.

19. A data storage device, the data storage device comprising:
a storage medium;
a read/write head assembly disposed in relation to the storage medium;
an analog to digital converter circuit operable to convert an information set from the storage medium via the read/write head assembly into a sample set;
a read channel circuit including:
an equalizer circuit operable to equalize the sample set to yield a data input;
a data detector circuit operable to apply a data detection algorithm to a detector input derived from the data input to yield a detected output;
a data decoder circuit operable to apply a data decoding algorithm to the detected output to yield a decoded data set; and
an inter-track interference cancellation circuit operable to calculate an estimated inter-track interference between an element of the data input and one or more elements of a data set from a location adjacent to the information set on the storage medium, wherein the inter-track interference is calculated based at least in part on a feedback derived from the decoded data set and hard decision data corresponding to the data set from a location adjacent to the information set on the storage medium.

20. The storage device of claim 19, wherein the storage device further comprises:
a solid state memory operable to receive data maintained on the storage medium.

* * * * *